United States Patent [19]

Rosenberg et al.

[11] Patent Number: 5,703,193
[45] Date of Patent: Dec. 30, 1997

[54] REMOVAL OF UNREACTED DIISOCYANATE MONOMER FROM POLYURETHANE PREPOLYMERS

[75] Inventors: Ronald Owen Rosenberg, Shelton; Ajaib Singh, Huntington, both of Conn.; Christopher James Maupin, Aurora, Ill.; Brian Scott Lombardo, Ansonia, Conn.

[73] Assignee: Uniroyal Chemical Company, Inc., Middlebury, Conn.

[21] Appl. No.: 657,135

[22] Filed: Jun. 3, 1996

[51] Int. Cl.⁶ .................................................. C08G 18/10
[52] U.S. Cl. ....................... 528/44; 528/76; 528/80; 528/85; 560/25; 560/26; 560/352; 560/360
[58] Field of Search .................... 560/352, 25, 26, 560/360; 528/44, 76, 80, 85

[56] References Cited

U.S. PATENT DOCUMENTS

| | | |
|---|---|---|
| 3,248,372 | 4/1966 | Bunge . |
| 3,384,624 | 5/1968 | Heiss . |
| 4,061,662 | 12/1977 | Marans .................................. 560/26 |
| 4,169,175 | 9/1979 | Marans et al. . |
| 4,182,825 | 1/1980 | Jackle ......................................... 528/61 |
| 4,288,577 | 9/1981 | McShane ................................ 525/453 |
| 4,385,171 | 5/1983 | Schnabel ................................. 528/491 |
| 4,888,442 | 12/1989 | Dunlap .................................... 560/352 |
| 5,202,001 | 4/1993 | Stamer ....................................... 203/49 |

FOREIGN PATENT DOCUMENTS 1101410  1/1968  United Kingdom .

*Primary Examiner*—John M. Cooney, Jr.
*Attorney, Agent, or Firm*—Daniel Reitenbach

[57] ABSTRACT

A process for reducing the amount of residual organic diisocyanate monomer in a polyurethane prepolymer reaction product mixture which comprises distilling the polyurethane prepolymer reaction product mixture in the presence of a combination of at least one inert first solvent with a boiling point below the boiling point of the residual organic diisocyanate monomer and at least one inert second solvent with a boiling point above the boiling point of the residual organic diisocyanate monomer, at a temperature which exceeds the vaporization temperature of the residual organic diisocyanate monomer and which is below the decomposition temperature of the polyurethane prepolymer.

15 Claims, No Drawings

REMOVAL OF UNREACTED DIISOCYANATE MONOMER FROM POLYURETHANE PREPOLYMERS

FIELD OF THE INVENTION

This invention relates to an improved process for removing residual organic diisocyanate monomer from polyurethane prepolymers.

BACKGROUND OF THE INVENTION

In preparing a polyurethane prepolymer, an organic diisocyanate monomer is reacted with a polyol, usually employing a stoichiometric excess of the diisocyanate monomer(an NCO:OH ratio greater than 1:1, usually about 2:1 or greater). The use of such an excess of diisocyanate monomer results in an undesirable amount of unreacted volatile diisocyanate monomer in the prepolymer reaction product mixture.

Several techniques have been described in the art as useful for reducing the amount of diisocyanate monomer in the prepolymer reaction product mixture. For example, British Patent 1,101,410 and U.S. Pat. No. 4,182,825 describe a process for distilling the prepolymer reaction product under vacuum conditions to reduce the amount of diisocyanate. U.S. Pat. No. 4,061,662 describes a process for the removal of unreacted tolylene diisocyanate from prepolymers by passing the prepolymer reaction product through a column containing a molecular sieve. U.S. Pat. No. 4,385,171 describes a method for the removal of unreacted diisocyanate from polyurethane prepolymers by codistilling the prepolymer reaction product with a compound which boils at a temperature greater than the boiling point of the diisocyanate. U.S. Pat. No. 4,888,442 describes a two-step process consisting of a first step of distilling the prepolymer reaction product to remove the bulk of the diisocyanate and then, in the second step, a solvent is added to the distilled prepolymer reaction product and the resultant mixture is passed through an agitated thin-film evaporator. According to this patent, the vaporization temperature of the solvent should be exceeded under the conditions employed in the thin layer evaporator. U.S. Pat. No. 4,288,577 describes the removal of unreacted methylene bis(4-phenyl isocyanate) (MDI) via solvent extraction with hexane.

The procedures described above relate to reduction of such traditional diisocyanate compounds as toluene diisocyanate (TDI), methylene-bis-(4-phenyl)isocyanate (MDI), and the like. Other diisocyanate monomers with high melting points, such as para-phenylene diisocyanate (PPDI), have not been easily removed from polyurethane prepolymers using known procedures.

It is known that in the distillation of diisocyanate monomers from polyurethane prepolymers, high temperatures must be avoided to prevent decomposition reactions in the prepolymer. For example, British Patent 1,101,410 recommends that distillation be conducted under vacumm with an evaporative temperature preferably under 175° C. U.S. Pat. No. 4,182,825 describes the use of 0.2–0.8 torr and evaporative jacket temperatures of 150°–160° C. with TDI.

It is desirable that the condensation temperature for the distillate be at least about 100° C. below the evaporative temperature to provide a driving force for the distillation. However, with higher-melting distillates, distillation is not always feasible because, to prevent blocking of condensers and achieve continuous operation, the condensation of the distillate must be carried out at a temperature where the distillate is still a liquid and can leave the evaporator free flowing. See, for example, K. J. Erdweg, "Fine Vacuum Evaporation" (Buss-SMS GmbH Verlahrenstechnik Technical Bulletin) (Buss-SMS GmbH, Butzbach, Germany).

It is an object of this invention to provide a new method for reduction of residual organic diisocyanate monomer in a polyurethane prepolymer reaction product mixture prepared from the reaction of an organic diisocyanate monomer and a polyol, particularly for reduction of residual organic diisocyanate monomers with high melting points, such as PPDI.

SUMMARY OF THE INVENTION

The present invention relates to a process for reducing the amount of residual organic diisocyanate in a polyurethane prepolymer reaction product mixture which comprises heating the polyurethane prepolymer reaction product mixture in the presence of at least one inert first solvent with a boiling point below the boiling point of the residual organic diisocyanate and at least one inert second solvent with a boiling point above the boiling point of the residual organic diisocyanate, at a temperature which exceeds the vaporization temperature of the residual organic diisocyanate (at the existing pressure) and which is below the decomposition temperature of the polyurethane prepolymer. The ratio of the first solvent to the second solvent is from about 20:1 to about 1:20. The combination of the first solvent and the second solvent, represents about 5 to about 85 percent by weight of the total weight of the polyurethane prepolymer reaction product mixture plus the solvents.

DETAILED DESCRIPTION OF THE INVENTION

The present invention is an improvement in the process for reducing the amount of residual polyisocyanate monomer in a polyurethane prepolymer reaction product mixture. For the purposes of this invention, the term "polyurethane prepolymer reaction product mixture" means the product produced from the reaction of an organic polyisocyanate with a polyol. Preferably, the organic polyisocyanate has a melting point of 50° C. or higher.

The polyurethane prepolymers of the present invention can be prepared by the reaction of an organic diisocyanate with a polyol using standard procedures known in the art.

In the process of this invention, certain inert solvents are used to facilitate the removal of residual diisocyanate monomers from the polyurethane prepolymers, by distillation. The distillation is generally conducted in agitated thin-film distillation equipment, also known as thin film evaporators, wiped film evaporators, short-path distillers, and the like. Preferably, the agitated thin-film distillation equipment comprises internal condensers and vacuum capability. Two or more distillation units can, optionally, be used in series. Such equipment is commercially available, e.g., Wiped Film Stills from Pope Scientific, Inc.; Rototherm "E" agitated thin-film processors from Artisan Industries, Inc.; Short-Path Evaporators from GEA Canzler GmbH & Co.; Wiped-Film Evaporators from Pfaudler-U.S., Inc.; Short Path Distillers from UIC Inc.; Agitated Thin-Film Evaporators from Luwa Corp.; and SAMVAC Thin Film Evaporators from Buss-SMS GmbH.

For the purposes of this invention, the term "lower-boiling inert solvents" means those solvents which have a boiling point lower than the diisocyanate monomer to be removed from the polyurethane prepolymer reaction product mixture. Preferably, such lower-boiling inert solvents have an atmospheric boiling point of from about 100° C. to about the atmospheric boiling point of the diisocyanate monomer to be removed. For the purposes of this invention, the term "higher-boiling inert solvents" means those solvents which have a boiling point higher than the diisocyanate monomer to be removed from the polyurethane prepolymer reaction product mixture. Preferably, such higher-boiling inert solvents have a boiling point of from about 1° to about 50° C. higher than the boiling point of the diisocyanate to be removed. The boiling points (bp) and melting points (mp) of the materials described herein are at atmospheric pressure, or 760 mm Hg (760 Torr), unless otherwise noted. The lower-boiling inert solvents and the higher-boiling inert solvents used in the process of this invention, should not have a deleterious effect on the polyurethane polymer under the temperature and pressure conditions used to remove the unreacted diisocyanate monomer.

Suitable organic diisocyanates include paraphenylene diisocyanate (PPDI), tolidene diisocyanate (TODI), isophorone diisocyanate (IPDI), 4,4'-methylene bis (phenylisocyanate) (MDI), toluene-2,4-diisocyanate (2,4-TDI), toluene-2,6-diisocyanate (2,6-TDI), naphthalene-1,5-diisocyanate (NDI), diphenyl-4,4'-diisocyanate, dibenzyl-4, 4'-diisocyanate, stilbene-4,4'-diisocyanate, benzophenone-4, 4'diisocyanate, 1,3- and 1,4-xylene diisocyanates, 1,6-hexamethylene diisocyanate, 1,3-cyclohexyl diisocyanate, 1,4-cyclohexyl diisocyanate (CHDI), the three geometric isomers of 1,1'-methylene-bis(4-isocyanatocyclohexane) (abbreviated collectively as $H_{12}MDI$), and mixtures thereof.

A preferred diisocyanate is PPDI which is characterized by a relatively low molecular weight (160.1), and an isocyanate content of 52.5%. PPDI has a high melting point (95° C.), which can present difficulties for efficient removal of residual PPDI using the methods previously known in the art. PPDI readily degrades to adducts of higher molecular weight if held at or above its melting point, an additional difficulty for distillation of PPDI. The vapor pressure of PPDI above the melting point of 95° C. is similar to that of TDI. The atmospheric boiling point of PPDI is about 260° C. When PPDI prepolymers are distilled using the film distillation equipment described above, the PPDI monomer frequently forms solid crystals on the cooler equipment surfaces, clogging the equipment and forcing termination of the distillation.

The use of the lower-boiling inert solvent in the process of this invention reduces diisocyanate monomer and distillate freeze-out on the cold trap and roof of agitated thin film or wiped film distillation equipment. It appears that the higher-boiling inert solvent works in conjunction with the lower-boiling inert solvent to condense internally, keeping the internal condensing surfaces free of diisocyanate crystals. The use of the combination of lower-boiling inert solvents with higher-boiling inert solvents is especially important to control freeze-out and desublimation of higher melting isocyanates such as PPDI, in manufacturing equipment for commercial manufacture of prepolymers.

Suitable lower boiling inert solvents for use with PPDI include, e.g., 1,2,3-trichlorobenzene (bp 218.5° C.), 1,2,4-trichlorobenzene (bp 213° C.), dimethylglutarate (bp 210°–215° C.), dimethyl adipate (bp 227°–230° C.), diethyl adipate (bp 251° C.), γ-butyrolactone (bp 204°–205° C.), dimethyl succinate (bp 200° C.), o-dichlorobenzene (bp 180° C.), m-dichlorobenzene (bp 172° C.), p-dichlorobenzene (bp 173° C.), and N-methylpyrollidone (bp 204° C.). Blends of lower-boiling inert solvents can be used in the process of this invention, provided that they are miscible with the polyurethane prepolymer reaction product mixture, and do not decompose or react with one another.

Preferred lower-boiling inert solvents include dimethyl adipate, diethyl adipate, diisopropyl adipate, ortho-, meta-, or para-dichlorobenzene, 1,2,3-trichlorobenzene, 1,2,4-trichlorobenzene, dimethyl glutarate, and dimethyl succinate.

Suitable higher-boiling inert solvents for use with PPDI include, e.g., tetrahydrothiaphene-1,1-dioxide and organic diesters such dimethyl phthalate, diethyl phthalate, dibutyladipate isomers, dioctyladipate isomers, and dimethylsebacate. Blends of higher-boiling inert solvents can be used in the process of this invention, provided that they are miscible with each other and with the polyurethane prepolymer reaction product mixture, and do not decompose or react with one another.

Preferred higher-boiling inert solvents for PPDI, such as dimethylphthalate (bp 282° C.), diethylphthalate (bp 298° C.), dibutyladipate (bp ~305° C.), and tetrahydrothiaphene-1,1-dioxide (Sulfolane®, Phillips 66, bp 285° C.), have boiling points from about 265 to about 310° C. Preferred higher-boiling inert solvents are those which do not react with the polyurethane prepolymer, do not decompose, and are easily removed.

It has been surprisingly discovered that by adding both a lower-boiling inert solvent and a higher-boiling inert solvent to the polyurethane prepolymer reaction product mixture and then distilling the resultant mixture, a large amount of the unreacted diisocyanate monomer is effectively removed. Levels of unreacted diisocyanate monomer in the polyurethane prepolymer reaction product mixture obtained by the process of this invention are preferably less than 0.5% by weight of the polyurethane prepolymer reaction product mixture, and more preferably, less than 0.1%, and most preferably, less than 0.05%.

The ratio of the lower-boiling inert solvent to the higher-boiling inert solvent in the process of this invention can be from about 20:1 to about 1:20 (w/w), preferably about 10:1 to about 1:10 (w/w), and more preferably, about 2:1 (w/w).

The choice of inert solvents in the process of this invention will be dependent upon the boiling point of the individual diisocyanate monomer used and the prepolymer produced, as well as on the other reaction conditions.

In the preparation of polyurethane and polyurethane/urea elastomers, the diisocyanate monomers are reacted with long chain (high molecular weight) polyols to produce prepolymers containing terminal isocyanate groups which then may be chain extended with short chain (low molecular weight) polyols or aromatic diamines to form polyurethane or polyurethane/urea elastomers. Long chain, high molecular weight polyols, e.g. those having a molecular weight (MW) of above 250, are generally utilized to form the prepolymer and the chain extender is generally a short chain polyol, e.g., $C_2$–$C_{15}$ polyol, or an aromatic diamine. The long chain, high molecular weight polyol provides flexibility and elastomeric properties to the resin, while the short chain polyol or aromatic diamine provides chain extension or cross-links and adds toughness and rigidity to the resulting elastomeric polymer.

High molecular weight polyols, typically polyether polyols, polyester polyols, or hydrocarbon polyols, having a number average molecular weight of at least 250, are often used to prepare the prepolymer of the instant invention. Molecular weight of about 500 to 6000 is preferred, with molecular weight in the range of 650–3000 being the most preferred. However, the molecular weight of the high molecular weight polyol may be as high as 10,000 or as low as 250. In addition, low molecular weight glycols and triols, with weights ranging from 60–250, may be included.

The preferred polyalkyleneether polyols may be represented by the general formula $HO(RO)_nH$, wherein R is an alkylene radical and n is an integer large enough that the polyether polyol has a number average molecular weight of at least 250. These polyalkyleneether polyols are well-known components of polyurethane products and can be prepared by the polymerization of cyclic ethers such as alkylene oxides and glycols, dihydroxyethers, and the like by known methods. Average hydroxyl functionality can range from about 2 to about 8, preferably from about 2 to about 3, and more preferably from about 2 to about 2.5.

The polyester polyols are typically prepared by reaction of dibasic acids (usually adipic acid but other components such as glutaric, succinic, azelaic, or sebacic acid, or phthalic anhydride, can be present) with diols such as ethylene glycol, 1,2-propylene glycol, 1,4-butylene glycol, 1,6-hexylene glycol, diethylene glycol, polytetramethylene ether glycol and the like. Polyols such as glycerol, trimethylol propane, pentaerthythritol, sorbitol, and the like may be used if chain branching or ultimate cross-linking is sought. Diesters can be used in place of dibasic acids. Some polyester polyols can also employ caprolactone and dimerized unsaturated fatty acids in their manufacture.

Hydrocarbon polyols can be prepared from ethylenically unsaturated monomers such ethylene, isobutylene, and 1,3-butadiene. Examples include polybutadiene polyols Poly-bd R-45 HT (Atochem) and DIFOL (Amoco Corp.); and Kraton L polyols (Shell Chemical Co.).

Polycarbonate polyols can also be used and can be prepared by reaction of glycols (e.g., 1,6-hexylene glycol) with organic carbonates (e.g., diphenyl carbonate, diethyl carbonate, or ethylene carbonate).

The curative, or chain extender, used with the prepolymer can be selected from a wide variety of conventional and well known organic diamine or polyol materials. Preferred materials are either low melting solids or liquids. Specifically preferred are the diamines, polyols, or blends thereof having a melting point below 140° C. These diamines or polyols are generally the present ones used in the industry as curatives for polyurethane. The selection of a curative is generally based on reactivity needs, property needs for a specific application, process condition needs, and pot life desired. Known catalysts may be used in conjunction with the curative.

Preferred curatives can be selected from aliphatic diols such as 1,4-butanediol (BDO), hydroquinone-bis-hydroxyethyl ether (HQEE), 1,4-cyclohexane dimethanol (CHDM), aliphatic triols such as trimethylolpropane, and aliphatic tetrols such as the commercial product Quadrol (BASF Corp.). Useful aromatic diamines include, for example, 4,4'-methylenedianiline (MDA), 2,2',5-trichloro-4, 4'methylenediamines, naphthalene-1,5-diamine, ortho, meta, and para-phenylene diamines, toluene-2,4-diamine, dichlorobenzidine, and diphenylether-4,4'-diamine, including their derivatives and mixtures.

Representative of the most preferred materials are aliphatic diols such as HQEE, BDO and CHDM, and diamines such as 4,4'-methylene-bis(3-chloroaniline) (MBCA), 4,4'-methylene-bis(3-chloro-2,6-diethylaniline) (MCDEA), diethyl toluene diamine (DETDA), tertiary butyl toluene diamine (TBTDA), dimethylthio-toluene diamine (Ethacure™ 300 from Albemarle Corporation), trimethylene glycol di-p-amino-benzoate (Polacure™ 740 from Air Products Corporation), 1,2-bis(2-aminophenylthio)ethane (Cyanacure from American Cyanamid Company), methylenedianiline (MDA) and methylenedianiline-sodium chloride complex (Caytur 21 and Caytur 31, from Uniroyal Chemical Company, Inc.).

Most preferred curatives for use with PPDI include BDO, HQEE, CHDM, MBCA, MCDEA, Ethacure 300, Polacure 740, MDA, Caytur 21 and Caytur 31.

These diamines or polyols are generally the ones currently used in the industry as curatives for polyurethane. The selection of a curative is generally based on reactivity needs, or property needs for a specific application, process condition needs, and pot life desired. Often such curatives are blended with polyether, polyester, polycarbonate, or hydrocarbon polyols of high molecular weight (250–10,000). Known catalysts may be used in conjunction with the curative if desired.

The inert solvents useful in the process of this invention are preferably added at the start of the prepolymer (adduct) synthesis. This facilitates the removal of the unreacted diisocyanate monomer without requiring an additional distillation of the monomer from the solvents. The mixture of inert solvents and diisocyanate monomer can be collected as distillate and used in future synthesis of the isocyanate prepolymer. With higher-melting monomers, such as PPDI, the process of this invention improves the ease of distillation by giving a liquid distillate at processing temperatures, and a liquid or slurry distillate for storage at ambient temperatures.

The amount of the inert solvents added will generally depend on the particular polyurethane prepolymer reaction mixture being treated, the particular inert solvents employed, and the distillation conditions. Generally, the inert solvents are used, as a combination, in an amount from about 5 to about 85 percent based on the total weight of the polyurethane prepolymer reaction product mixture plus the solvents. A more preferred range is from about 10 to about 70 percent based on the total weight of the polyurethane prepolymer reaction product mixture plus the solvents.

In a preferred embodiment, the process of this invention is conducted by adding the selected inert solvents during the synthesis of the crude polyurethane prepolymer reaction product derived from the reaction between an excess of organic diisocyanate monomer and a polyol, and then subjecting the resulting polyurethane prepolymer reaction product mixture to distillation conditions. The solvents may be added at any time during the reaction prior to the distillation. More preferably, the solvents can be used in a recycled solution or slurry of inert solvents and diisocyanate monomer during prepolymer synthesis.

In general, the process of this invention is carried out in a conventional manner employed for purification by distillation. Use of distillation equipment, such as wiped film evaporation and vacuum distillation are familiar to those skilled in the art. See, e.g., *Laboratory Experiments in Organic Chemistry*, by Adams et al, Sixth Edition, Macmillan.

The actual temperature and pressure conditions of the distillation should be such that the vaporization point of the diisocyanate monomer is exceeded without decomposing the polyurethane prepolymer. The actual temperature and pressure can vary therefore and are dependent upon the diisocyanate monomer being removed, the polyurethane prepolymer, other components of the polyurethane prepolymer reaction product mixture, and so on. For PPDI and TDI monomers, e.g., temperatures can range from about 100° C. to about 160° C. and the pressure can range from about 0.01 to about 2 mm Hg. If the monomer is MDI, the distillation temperature can range from about 120° C. to about 175° C. and the pressure can range from about 0.002 mm Hg to about 0.5 mm Hg. The process of this invention can be carried out batchwise, semi-continuously, or continuously. Usually, short residence times are preferable. Preferred residence times can range from about 10 seconds to about 5 minutes.

In one preferred embodiment, the diisocyanate monomer used for prepolymer synthesis is PPDI, the codistillation is conducted in a wiped film evaporator with a jacket temperature of 120° C., a temperature of 27° C. for the internal condenser, 0.2 mm Hg pressure, and the inert solvents are dimethylphthalate and dimethylglutarate used in ratios ranging from 1:1 to 1:3 (w/w).

Free NCO content can be determined by a procedure similar to that described in ASTM D1638-70, but employing tetrahydrofuran as the solvent. Unreacted PPDI monomer content of prepolymers can determined by HPLC.

The following examples are illustrative of the present invention.

EXAMPLES

In the examples below, the terms "ABA" and "ABABA" are used. "A" denotes a PPDI (or MDI or TDI) moiety and "B" denotes a polyol moiety (such as, e.g., PTMEG). Accordingly, when A is PPDI, the term "ABA" denotes a molecule with the structure "PPDI-Polyol-PPDI" "ABABA", therefore, denotes a higher molecule weight molecule (sometimes referred to as an "oligomer") with a structure "PPDI-Polyol-PPDI-Polyol-PPDI".

The major components of a polyurethane prepolymer reaction product mixture are unreacted A (e.g., free PPDI monomer), ABA, and ABABA.

The most desirable component is ABA in substantially pure form. ABABA is less desirable because it imparts high viscosity to the composition. Unreacted A is undesirable because it creates toxic atmospheric fumes in handling, and short pot life with curative.

As demonstrated by the examples below, ABA can be produced with minimal formation of ABABA by employing a large starting excess of A over B (molar ratio of 3.0/1 to 10/1). Despite the large starting excess of A, however, by utilizing the method of this invention, ABA is produced substantially free of unreacted A.

Each ABA and ABABA adduct has two unreacted NCO groups, one on each of the terminal A moieties. The internal A moiety in the ABABA adduct has no remaining unreacted NCO group. Therefore, the ABABA adduct has a lower NCO content than the ABA adduct. The relative content of ABA and ABABA in a polyurethane prepolymer reaction product mixture substantially free of unreacted A, can be determined by the NCO content of the polyurethane prepolymer reaction product mixture.

Comparative Example A

Removal of Unreacted TDI Monomer Without Solvents

Vibrathane B 839, a commercial prepolymer consisting essentially of the reaction product of polytetramethylene ether glycol (PTMEG) and toluene diisocyanate (TDI), and containing about 2.5% by weight unreacted TDI monomer (free TDI), was treated by vacuum distillation to remove the free TDI in accordance with the procedure described in U.S. Pat. No. 4,182,825. (Residual levels of free TDI were reduced to as low as 0.05% in this patent.) No coboiling solvents were required.

A conventional vertical glass wiped film evaporator with an internal condenser and a heated jacket evaporative surface of 0.6 square feet was used. This vertical apparatus, essentially a column, was employed by feeding prepolymer at the top. The prepolymer flowed downward through the column by gravity as it was wiped as a heated film on the inside of the column. Volatile monomer evaporated from this film, then condensed to a liquid on an internal condenser located within this column. Both distillate and residue continued flowing downward by gravity to discharge pumps and receiver vessels.

Jacket temperature was 140° C. Internal condenser temperature was 38° C. Vacuum was 0.005 torr. The prepolymer was passed through this apparatus once.

Under these conditions, free TDI in the prepolymer was reduced from 2.5% to 0.2% by weight. The TDI distillate was a liquid that was easily pumped to a receiving vessel.

Comparative Example B

Removal of Unreacted MDI Monomer Without Use of Solvents

Vibrathane B 635, a commercial prepolymer consisting essentially of the reaction product of PTMEG 1000 mw (1 mole) and diphenylmethane diisocyanate (MDI) (approx. 2.6 moles), and containing about 14% by weight unreacted free MDI, was treated on the equipment described in Comparative Example A to remove the free MDI. No solvents were used.

Jacket temperature was 161° C. Internal condenser temperature was 65° C. Vacuum was 0.004 torr. The prepolymer was passed through this apparatus once.

Under these conditions, free MDI in the prepolymer was reduced from 14% to 0.35% by weight. The liquid MDI distillate could readily be pumped to a receiving vessel.

Comparative Example C

Removal of High Levels of Unreacted MDI Monomer Without Solvents

A prepolymer with very high levels of free MDI was prepared by reacting PTMEG 1000 mw with MDI in 1:10 molar ratio at 60° C. These conditions favor the exclusive formation of adducts consisting of one PTMEG moiety and two MDI moieties (essentially no higher molecular weight adducts), as described in Great Britain Patent No. 1,101,410. Such adducts have desirable low viscosity, but are difficult to manufacture because of the high amount of unreacted diisocyanate monomer to be removed. From an initial charge of 10 moles of MDI, at least 8 moles (about 57% by weight of the prepolymer) remain unreacted for subsequent removal by distillation.

The prepolymer was passed through a glass wiped film evaporator similar to the apparatus of Comparative Example A, but with heated jacket area of 0.5 square feet. All subsequent examples also use this apparatus.

To remove the large amount of free MDI, three passes were used. Jacket temperature was 140° C. on the first pass and 160° C. on the next two passes. Internal condenser temperature was 43° C. on each pass. Vacuum was in the range of 0.02 to 0.06 torr for each pass.

Under these conditions, free MDI was reduced from an estimated starting level of about 57% to 21%, 3.0%, and 0.7% after the first, second, and third passes, respectively. In each pass, the liquid MDI distillate drained freely to a receiving vessel.

The final prepolymer had a free NCO content of 5.54%, 99% of the theoretical value of 5.6% for the pure adduct of one mole of PTMEG 1000 mw with two moles of MDI.

Comparative Example D

Preparation of PPDI Prepolymer with 3.3% Free PPDI Monomer

Prepolymer D was prepared from PPDI and PTMEG 1000 MW in 2.0 molar ratio (also 2.0 NCO/OH functional group ratio), by the following procedure. About 1200 lb PTMEG (about 1000 MW) was loaded to an agitated batch reactor equipped with jacket heating and cooling. The PTMEG was heated to 50°–65° C. and then about 787 lb PPDI flake was loaded. The temperature of the resultant reaction mixture rose to 70° C. Another about 1200 lb PTMEG was then added to the reaction mixture. The reaction mixture was then treated at 80° C. for 2–3 hours. About 0.25 lb benzoyl chloride was then added to the reaction mixture as a heat stabilizer, and the reaction mixture was treated at 80° C. for 2 more hours, to produce Prepolymer D.

Prepolymer D had 6.5% free NCO content and 3.3% free PPDI monomer content.

Comparative Example E

Unsuccessful Removal of Unreacted PPDI Monomer Without Solvents

Prepolymer D (containing 3.3% free PPDI) was processed through the wiped film evaporator that was used with MDI in Comparative Example C.

Jacket temperature was 140° C. Internal condenser temperature was 20°–25° C. Vacuum was 0.1 torr. One pass was used.

Under these conditions, free PPDI in Prepolymer D was reduced from 3.3% to 0.01%. However, distillation had to be discontinued shortly after starting. The PPDI distillate collected as a solid on unheated surfaces inside the evaporator, particularly on the internal condenser. Continued operation would have choked off the passageways in the apparatus with solid PPDI.

Comparative Example F

Unsuccessful Removal of Free PPDI Monomer With High-Boiling Solvent

A blend of 5 parts PPDI monomer, 45 parts Adiprene LF 95, and 50 parts dimethylphthalate (DMP) solvent was prepared for PPDI distillation studies. Adiprene LF 95 is a reaction product of PTMEG and TDI in which free TDI has been reduced to below 0.1% by weight in accordance with U.S. Pat. No. 4,182,825. Essentially the only volatile materials in the blend were the PPDI monomer (b.p. 260° C.) and the higher-boiling DMP solvent (b.p. 282° C.).

The blend was then processed on a wiped film evaporator as described in Comparative Example C. Distillation jacket temperature was 140° C. Internal condenser temperature was about 43° C. Vacuum was 0.03 torr. One pass was used.

Under these conditions, the free PPDI content of the blend was reduced from 5% initial to below 0.05%. Distillate (PPDI solution in DMP) flowed as a liquid to the receiver vessel. However, PPDI crystals collected and grew inside the wiped film evaporator, particularly on the roof. The experiment was terminated shortly after being started.

Comparative Example G

Unsuccessful Removal of Free PPDI Monomer With Low-Boiling Solvent

Comparative Example F was run with 1,2,4-trichlorobenzene (b.p. 214° C.) replacing DMP (b.p. 282° C.) as the solvent.

Jacket temperature was 120° C. Internal condenser temperature was about 27° C. Vacuum was 0.2 torr. One pass was used.

Under these conditions, free PPDI in the blend was reduced from 5% initial to below 0.05%. Distillate (PPDI in trichlorobenzene solvent) flowed as a liquid to the receiver vessel. However, PPDI crystals did collect and grow on the internal condenser, rendering sustained operation impractical. The experiment was terminated.

Example 1

Successful Removal of Free PPDI Monomer With Combined High-Boiling and Low-Boiling Solvents Comparative Examples F and G were replicated, using a 25/25 blend of high-boiling and low-boiling solvents. Accordingly, a solution was prepared from 5 parts PPDI monomer (b.p. 260° C.), 45 parts Adiprene LF 95, 25 parts DMP solvent (b.p. 282° C.), and 25 parts dimethylglutarate solvent (DMG, b.p. 210°–215° C.).

This solution was then processed on the wiped film evaporator used in Comparative Example C. Jacket temperature was 120° C. Internal condenser temperature was about 27° C. Vacuum was varied from 0.4 to 0.2 to 0.1 torr.

Under these conditions, free PPDI in the solution was reduced from 5% initial to below 0.05%. In all cases the distillates (PPDI dissolved in DMP and DMG solvents) were liquids that flowed readily to the receiver. In all cases the wiped film evaporator remained free of solid deposits, permitting sustained operation.

Example 2

Preparation of PPDI Prepolymer with DMG and DMP for Distillation

To a batch reactor equipped with agitation and a heating mantle, was charged, proportionally, a mixture of: 3881 parts DMG; 1941 parts DMP; 0.16 parts of 85% phosphoric acid, and 1456 parts PPDI. The mixture was heated with agitation to 65° C. and held for one hour to fully dissolve the PPDI (creating a 20% solution of PPDI), then cooled to 50° C. PTMEG was then added to the mixture in 3:1 PPDI:PTMEG molar ratio. 2722 parts of PTMEG 900 mw (blend of 1000 mw and 650 mw) was slowly added to the mixture, maintaining the temperature of the mixture below 70° C. The resultant reaction mixture was then treated for 2 hours at 60° C. Free PPDI content at the end was 5%.

Examples 3–9

Successful Removal of Free PPDI Employing DMP and DMG Together

The prepolymer produced in Example 2 was passed once through the same wiped film evaporator used in Comparative Example C, under varying conditions. Jacket temperature was varied between 120° C. and 140° C. Internal condenser temperature was 20°–25° C. Vacuum was varied from 2 torr to 0.1 torr. Feed rate was varied from about 200 to about 1000 ml/hour.

Under all conditions, free PPDI was reduced from 5% initial to under 0.05%. The distillates (PPDI in solvents DMP and DMG) were liquids that drained freely to the receiver vessel. No deposits of solid PPDI were observed within the wiped film evaporator. One pass was also sufficient under some conditions (Examples 7 and 9) to reduce combined DMP and DMG levels from 58% initial to below 0.2%. Results are summarized below in Table 1.

The stripped prepolymer of Example 9 had 6.04% NCO content, close to the theoretical value of 6.89% NCO for the pure ABA adduct of two moles PPDI with one mole of PTMEG 900 mw.

TABLE 1

WIPED FILM EVAPORATION OF PPDI FROM PREPOLYMER OF EXAMPLE 2

| EXAMPLE | JACKET TEMP. (°C.) | VACUUM (TORR) | FEED RATE (ML/HR) | % FREE PPDI | % DMG | % DMP |
|---|---|---|---|---|---|---|
| 2 (Feed) | — | — | — | 5 | 39 | 19 |
| 3 | 120 | 2.0 | 350 | 0.04 | 0.25 | 0.83 |
| 4 | 120 | 1.2 | 350 | 0.03 | 0.15 | 0.55 |
| 5 | 120 | 0.6 | 350 | 0.03 | 0.25 | 0.32 |
| 6 | 120 | 0.6 | 1000 | 0.02 | 0.09 | 3.1 |
| 7 | 120 | 0.1 | 200 | 0.03 | 0.16 | 0.03 |
| 8 | 140 | 0.1 | 350 | 0.04 | 0.26 | 0.03 |
| 9 | 140 | 0.1 | 1000 | 0.02 | 0.06 | 0.11 |

In the following examples H to I and 10 to 20, a comparison was made of conventional high free PPDI prepolymers and the low free PPDI prepolymers of the present invention. This comparison was made with prepolymers having similar overall PPDI content, about 22%.

Comparative Example H

Preparation of High Free PPDI Prepolymer at 2.0 NCO/OH

To a 5000 ml round bottom flask equipped with stirrer, thermometer, and heating mantle was loaded 613 grams of PTMEG (2030 mw) and 2100 grams of PTMEG (982 mw). The resultant reaction mixture was heated to 60° C., after which 0.28 grams benzoyl chloride and 788 grams PPDI flake were then added to the reaction mixture. (Overall, PPDI:PTMEG molar charge, or NCO:OH charge, was 2.0.) The resultant reaction mixture was then heated at 80° C. for two hours to produce Prepolymer H. This prepolymer was found to have 5.80% NCO content and 2.9% free PPDI content.

Comparative Example I

Preparation of High Free PPDI Prepolymer at 3.1 NCO/OH

Prepolymer I was prepared by the procedure described above in H, except that the amounts of PTMEG were modified to yield an overall molar PPDI:PTMEG (NCO:OH) charge of 3.1. This synthesis used 2231 grams of PTMEG (2030mw) and 481 grams of PTMEG (982 mw). Prepolymer I was found to contain 7.60% NCO and 4.6% free PPDI.

A summary of the prepolymer compositions for comparative Examples D, H, and I, each containing high levels of free PPDI, appears in Table 2 below. Each prepolymer contained about 22–25% PPDI total (reacted and unreacted).

TABLE 2

PREPARATION OF CONVENTIONAL HIGH FREE PPDI PREPOLYMERS

| Prepolymer Product | H | I | D |
|---|---|---|---|
| NCO/OH Ratio | 2.0 | 3.1 | 2.0 |
| PPDI, % of total | 22.5 | 22.5 | 24.7 |
| PTMG (MW ~2000) Mass | 613 g | 2231 g | — |
| PTMG (MW ~1000) Mass | 2100 g | 481 g | 2393 lb. |
| PPDI Mass | 788 g | 788 g | 787 lb. |
| Benzoyl Chloride Mass | 0.28 g | 0.28 g | 0.25 lb. |
| Reactive NCO, % | 5.8 | 7.8 | 6.5 |
| Unreacted PPDI, % | 2.9 | 4.6 | 3.3 |

Example 10

Synthesis of 2.0 NCO/OH PPDI Prepolymer with Solvents for PPDI Removal

To a 5000 ml round bottom flask equipped with stirrer, nitrogen sweep, thermometer, and heating mantle was added 3000 grams of Prepolymer D, 164 grams of DMP, and 164 grams of DMG (DMG/DMP ratio was 1.0.) The resultant reaction mixture was then heated to 50° C. for 15 minutes to produce a uniform solution, Prepolymer 10.

Example 11

Synthesis of 3.2 NCO/OH PPDI/PTMEG (2030 mw) Prepolymer with Solvents for PPDI Removal To a 5000 ml round bottom flask equipped with stirrer, nitrogen sweep, thermometer, and heating mantle, was added 1350 grams of DMP, 450 grams of DMG, 550 grams of PPDI flake, and 0.12 grams of benzoyl chloride.

The resultant reaction mixture was heated to 50° C. 420 Grams of PTMEG (2030 mw) was then added to the reaction mixture and allowed to react for 15 minutes. Successive doses of 450 grams and 1330 grams PTMEG (2030 mw) were then added to the reaction mixture at 15 minute intervals. The resultant mixture was then treated at 10 60° C. for one hour to produce Prepolymer 11.

Example 12

Synthesis of 3.0 NCO/OH PPDI/PTMEG (994 mw) Prepolymer with Solvents for PPDI Removal To a 12,000 ml round bottom flask equipped with stirrer, nitrogen sweep, thermometer, and heating mantle was added 2350 grams of DMG, 2350 grams of DMP, 1400 grams of PPDI flake, and 0.15 grams of benzoyl chloride. The resultant reaction mixture was heated to 50° C. Three portions of PTMEG (994 mw) were then added to the reaction mixture at 15 minute intervals: 725 grams, then 725 grams, then 1450 grams. The resultant mixture was then heated at 60° C. for two hours to produce Prepolymer 12.

Example 13, 14, 15

Removal of Free PPDI From Prepolymers 10, 11, 12

Unreacted PPDI monomer and the inert solvents present in Prepolymers 10, 11, and 12 above were removed using the wiped film evaporator of Comparative Example C above, to produce Prepolymers 13, 14, and 15, respectively. Jacket temperature was 120° C. Vacuum was 0.12 torr to 0.20 torr. Two passes were used for Prepolymer 11; one pass was used for prepolymers 10 and 12. In each case, free PPDI was reduced to 0.05% or below.

Prepolymer 13 (2.0 NCO/OH synthesis) had 4.34% NCO content, only 68% of the theoretical value of 6.37% for the pure ABA adduct of two moles PPDI with one mole PTMEG (1000 mw). This suggests the presence of impurities such as higher molecular weight adducts, e.g. ABABA.

Prepolymer 14 (3.2 NCO/OH synthesis) had 3.18% NCO content, 89% of the theoretical value of 3.58% for the pure ABA adduct. This demonstrates the value of high NCO/OH ratio (about 3.2 or higher) in synthesizing nearly pure ABA adduct.

Prepolymer 15 (3.0 NCO/OH synthesis) had 5.62% NCO content, 88% of the theoretical value of 6.40% for the pure ABA adduct. This again demonstrates the effect of high NCO/OH ratio.

Example 16

Physical Blend of Low Free PPDI Prepolymers 14 and 15

Prepolymers 14 and 15 were blended in 21/79 weight ratio to yield a low free PPDI prepolymer with about 22% total PPDI content, similar to low free PPDI prepolymer 13 and to conventional high free PPDI prepolymers H and I.

A summary of the prepolymer compositions in Examples 10–16 appears in Table 3 below.

TABLE 3

PREPARATION OF LOW FREE PPDI PREPOLYMERS

| Prepolymer | 10 | 13* | 11 | 14* | 12 | 15* | 16** |
|---|---|---|---|---|---|---|---|
| NCO/OH Synthesis Ratio | 2.0 | — | 3.2 | — | 3.0 | — | 3.0 to 3.2 |
| PPDI % of total (excluding solvents) | 24.7 | 22.7 | 20.0 | 13.7 | 32.6 | 24.4 | 22 |
| PTMG (MW ~2000) | — | — | 2200 | — | — | — | — |
| PTMG (MW ~1000) | 2258 | — | — | — | 2900 | — | — |
| PPDI | 741 | — | 550 | — | 1800 | — | — |
| DMP Solvent | 164 | — | 1350 | — | 2350 | — | — |
| DMG Solvent | 164 | — | 450 | — | 2350 | — | — |
| Reactive NCO % | — | 4.34 | — | 3.18 | — | 5.62 | 5.11 |
| Unreacted PPDI % | High | 0.04 | High | 0.03 | High | 0.05 | 0.05 |

*Distilled
**Blend

Examples 17–20

Curing of Prepolymers to Elastomers

Prepolymers 13 and 16, and Comparative Prepolymers H and I, were reacted with 1,4-butanediol to generate solid cured elastomers. These prepolymers all contained about 22–23% total PPDI (reacted and unreacted). They varied in free PPDI level and in synthesis NCO/OH ratio. The following procedure was used to generate the elastomers. A 600 gram quantity of each prepolymer was weighed into a one quart metal can, heated to 100° C., and degassed in a vacuum chamber. The can was then heated to 70° C. (82° C. for Prepolymer 13) and 1,4-butanediol was added at 95% of the stoichiometric amount of the NCO groups in the prepolymer. The mixture was stirred thoroughly for about one minute, then degassed, then poured into metal molds preheated to 121° C. After one hour, each sample was elastomeric and was removed from the mold to postcure at 121° C. for 16 hours. Additionally, each sample was allowed to postcure at ambient temperature for another four weeks.

Physical properties are summarized in Table 4 below. All preparations show good mechanical properties.

Similar mixtures were monitored for viscosity increase to 100 poise (useful pour life) with a Brookfield viscometer. Viscosities of the starting prepolymers were also determined. These data are also presented in Table 4.

The results in Table 4 show some of the advantages achievable using the method of this invention.

First, lower levels of free PPDI monomer will reduce worker exposure to volatile, toxic PPDI fumes.

Second, the method of this invention permits the use of higher NCO/OH ratio in the synthesis stage. Free PPDI is higher when high NCO/OH ratio is used, e.g. 3.1 vs. 2.0 NCO/OH. Consequently, Comparative Prepolymer I experienced freezeout (attributed to high concentration of free PPDI monomer, m.p. 95° C.) at temperatures as high as 50° C., and had a short pour life at 70° C.

By contrast, Prepolymer 16 was a low viscosity liquid at 50° C. and even at 25° C. Useful pour life was more than twice that of Comparative Prepolymer I. Note that both prepolymers 16 and I contained about 22–23% total PPDI and were synthesized at 3.0–3.2 NCO/OH ratio. The advantages of Prepolymer 16 are attributable to its preparation with free PPDI removal.

Prepolymer 16 also possessed considerably lower viscosity than Prepolymer 13, due to its synthesis at 3.0–3.2 NCO/OH vs. 2.0 NCO/OH.

TABLE 4

ELASTOMERS PREPARED FROM PREPOLYMERS WITH 1,4-BUTANEDIOL CURATIVE

| Cured Elastomer | 17 | 18 | 19 | 20 |
|---|---|---|---|---|
| Prepolymer | H | I | 13 | 16 |
| Properties | | | | |
| Unreacted PPDI (weight %) | 2.9 | 4.6 | 0.04 | 0.05 |
| Total PPDI (weight %) | 22.5 | 22.5 | 22 | 22 |
| Synthesis NCO/OH | 2.0 | 2.1 | 2.0 | 3.0–3.2 |
| Reactive NCO (%) | 5.8 | 7.6 | 4.34 | 5.11 |
| Curative Level, g/100 g Prepolymer | 5.9 | 7.7 | 4.4 | 5.2 |
| Prepolymer Viscosity - Poise | | | | |
| 25° C. | 190 | (Solid PPDI) | 390 | 112 |
| 50° C. | 30 | (Solid PPDI) | 38 | 22 |
| 100° C. | 3.8 | 3.7 | 4.4 | 2.7 |
| Processing Temperature, °C. | 70 | 70 | 82 | 70 |
| Pour Life, Minutes | 5.0 | 2.5 | 5.2 | 6.4 |
| Hardness, Shore A | 97 | 97 | 95 | 97 |
| Tensile Modulus, 100% elongation (psi) | 1890 | 1890 | 1430 | 1880 |
| Shear Modulus, 30° C. ($10^8$ dynes/cm$^2$) | 8.22 | 6.36 | 5.13 | 6.99 |
| 150° C. | 6.44 | 5.91 | 4.39 | 5.47 |
| % Retention | 79 | 93 | 86 | 78 |
| Tangent Delta, 30–150° C., maximum | 0.041 | 0.023 | 0.040 | 0.028 |

Comparative Example J

Preparation of PPDI Prepolymer with 2% Free PPDI

Prepolymer J was prepared from PPDI and PTMEG 2000 MW in 2.0 molar ratio (also 2.0 NCO/OH functional group ratio), plus trace amounts of diethylene glycol and benzoyl chloride, by the procedure described in Comparative Example D. NCO content of Prepolymer J was about 3.6%. Free PPDI content was about 1.8%. Viscosity of Prepolymer J was determined to be 69 poise at 46° C.

Example 21

Synthesis of 10 NCO/OH PPDI/PTMEG (2000 MW) Prepolymer with Solvents for PPDI Removal This example and Example 22 below combined illustrate the production of nearly pure PPDI-polyol-PPDI ABA structure, substantially free of higher ABABA oligomers or residual PPDI monomer, using high NCO/OH ratio and the combination of a lower boiling solvent and a higher boiling solvent, for free PPDI removal.

A 7.5% solution of PPDI in 2/1 w/w DMG/DMP was obtained from distillation of PPDI prepolymers prepared by the procedures described in Examples 2–9. Upon standing at room temperature, a small amount of white precipitate formed slowly and settled from an otherwise clear solution.

The solution was then decanted or filtered from the solids. Titration of NCO content confirmed that PPDI concentration in the solution was stable.

To a 5000 ml flask as described in Example 11, was added 2445 g of this solution containing 183 g PPDI monomer (2.3 NCO equivalents), 1508 g DMG, and 754 g DMP. To the solution in the flask was added 231 g PTMEG 2000 (0.23 OH equivalents, lot analysis 2030 MW) and 0.030 g phosphoric acid with agitation. The resultant reaction mixture was heated at 60° C. for two hours to produce Prepolymer 21. Free PPDI content was 5.35% by HPLC, close to the value of 5.47% predicted if each PTMEG molecule formed ABA adduct with two PPDI molecules (leaving eight PPDI molecules unreacted). Combined solvent content of this reaction mixture was about 85%.

Example 22

Removal of Free PPDI from Prepolymer 21

Unreacted PPDI monomer and the inert solvents present in Prepolymer 21 were removed by the methods described in Examples 3–9, using 140° C. jacket temperature and 0.1 torr vacuum. Three passes were employed to ensure thorough removal of the high levels of PPDI monomer and solvent.

Free PPDI was reduced from 5.35% to 0.05%, 0.04%, and 0.04% on the three successive passes.

Residual DMG was reduced from 56% to 0.24%, 0.056%, and 0.032% on the three successive passes.

Residual DMP was reduced from 28% to 1.4%, 0.084%, and 0.006% on the three successive passes.

The resulting Prepolymer 22 had 3.51% NCO, 98% of the theoretical value of 3.57% for pure ABA adduct free of higher molecular weight oligomers.

The viscosity of Prepolymer 22 was determined to be 46 poise at 46° C., substantially lower than that of Comparative Prepolymer J.

What is claimed is:

1. A process for reducing the amount of residual organic diisocyanate monomer in a polyurethane prepolymer reaction product mixture which comprises heating the polyurethane prepolymer reaction product mixture in the presence of a combination of at least one inert first solvent with a boiling point below the boiling point of the residual organic diisocyanate monomer selected from the group consisting of dimethyl glutarate, dimethyl adipate, diethyl adipate, diisopropyl adipate, ortho-, meta-, or para-dichlorobenzene, 1,2,3-trichlorobenzene, 1,2,4-trichlorobenzene, γ-butyrolactone, and dimethyl succinate, and at least one inert second solvent with a boiling point above the boiling point of the residual organic diisocyanate monomer selected from the group consisting of dimethylphthalate, diethylphthalate, and an isomer of dibutyladipate, at a temperature which exceeds the vaporization temperature of the residual organic diisocyanate monomer and which is below the decomposition temperature of the polyurethane prepolymer, wherein the combination of the first solvent and the second solvent comprises about 5 to about 85 percent by weight of the total weight of the polyurethane prepolymer reaction product mixture plus the solvents, and wherein the ratio of the first solvent to the second solvent is from about 20:1 to about 1:20.

2. A process as recited in claim 1 wherein the melting point of the residual organic diisocyanate monomer is greater than 50° C.

3. A process as recited in claim 2 wherein the boiling point of the second solvent is between about 1° C. and about 50° C. above the boiling point of the residual organic diisocyanate monomer.

4. A process as recited in claim 2 wherein the residual organic diisocyanate monomer is para-phenylene diisocyanate.

5. A process as recited in claim 1 wherein the residual organic diisocyanate monomer is reduced below about 0.5% by weight of the polyurethane prepolymer reaction product mixture.

6. A process as recited in claim 5 wherein the residual organic diisocyanate monomer is reduced below about 0.1% by weight of the polyurethane prepolymer reaction product mixture.

7. A process as recited in claim 6 wherein the residual organic diisocyanate monomer is reduced below about 0.05% by weight of the polyurethane prepolymer reaction product mixture.

8. A process as recited in claim 1 wherein the combination of first solvent and second solvent comprises about 10 to about 70 percent by weight based on the total weight of the polyurethane prepolymer reaction product mixture plus the solvents.

9. A process as recited in claim 1 wherein the ratio of the first solvent to the second solvent is from about 5:1 to about 1:5.

10. A process as recited in claim 9 wherein the ratio of the first solvent to the second solvent is about 2:1.

11. A prepolymer prepared in accordance with the process recited in claim 1.

12. A prepolymer as recited in claim 11 wherein the organic diisocyanate monomer is a PPDI monomer.

13. A prepolymer prepared by reacting a polyol with a stoichiometric excess of para-phenylene diisocyanate (PPDI) monomer and subsequently removing unreacted PPDI monomer, which prepolymer comprises less than 0.5% by weight of unreacted PPDI monomer.

14. A prepolymer as recited in claim 13 which comprises less than 0.1% by weight of unreacted PPDI monomer.

15. A prepolymer as recited in claim 14 which comprises less than 0.05% by weight of unreacted PPDI monomer.

* * * * *